(12) United States Patent
Neubauer

(10) Patent No.: US 12,384,633 B2
(45) Date of Patent: Aug. 12, 2025

(54) DEVICE FOR CONVEYING CONTAINERS AND USE THEREOF

(71) Applicant: KRONES AG, Neutraubling (DE)

(72) Inventor: Michael Neubauer, Grassau (DE)

(73) Assignee: KRONES AG, Neutraubling (DE)

( * ) Notice: Subject to any disclaimer, the term of this patent is extended or adjusted under 35 U.S.C. 154(b) by 50 days.

(21) Appl. No.: 18/206,424

(22) Filed: Jun. 6, 2023

(65) Prior Publication Data
US 2023/0399183 A1 Dec. 14, 2023

(30) Foreign Application Priority Data

Jun. 8, 2022 (DE) .......................... 102022114419.4

(51) Int. Cl.
| | | |
|---|---|---|
| *B65G 54/02* | (2006.01) | |
| *B65B 43/52* | (2006.01) | |
| *B65C 9/02* | (2006.01) | |
| *B65G 47/24* | (2006.01) | |
| *B65G 47/52* | (2006.01) | |
| *B65G 47/90* | (2006.01) | |

(52) U.S. Cl.
CPC .............. *B65G 54/02* (2013.01); *B65B 43/52* (2013.01); *B65C 9/02* (2013.01); *B65G 47/24* (2013.01); *B65G 47/52* (2013.01); *B65G 47/90* (2013.01); *B65G 2201/0235* (2013.01); *B65G 2201/0261* (2013.01)

(58) Field of Classification Search
CPC .... B65G 2201/0261; B65G 2201/0235; B65G 54/02; B65G 47/90; B65G 47/24; B65G 47/52; B65B 43/52; B65C 9/02
See application file for complete search history.

(56) References Cited

U.S. PATENT DOCUMENTS

| | | | |
|---|---|---|---|
| 5,771,657 A | | 6/1998 | Lasher et al. |
| 6,688,839 B1 | * | 2/2004 | Hirschek ................. B65B 35/50 |
| | | | 198/347.1 |
| 8,167,113 B2 | | 5/2012 | Mougin et al. |
| 8,834,779 B2 | | 9/2014 | Hahn et al. |

(Continued)

FOREIGN PATENT DOCUMENTS

| | | |
|---|---|---|
| CN | 114057143 A | 2/2022 |
| DE | 1206783 B | 12/1965 |

(Continued)

OTHER PUBLICATIONS

English Abstract of DE 202005019906 U1 (2007).

(Continued)

*Primary Examiner* — James R Bidwell
(74) *Attorney, Agent, or Firm* — Caesar Rivise, PC

(57) ABSTRACT

The invention relates, inter alia, to a device for conveying containers for a container processing facility. The device has a first, preferably continuous, container conveyor, a second, preferably continuous, container conveyor, which has multiple preferably plate-shaped carriers for transporting the containers, and a transfer station by use of which the containers can be removed from the first container conveyor and positioned on the multiple carriers of the second container conveyor. Advantageously, the device allows unstable containers to be transported securely and these containers to be buffered by use of the carriers.

19 Claims, 2 Drawing Sheets

(56) References Cited

U.S. PATENT DOCUMENTS

| | | |
|---|---|---|
| 10,486,914 B2 | 11/2019 | Choplin |
| 10,643,875 B2 | 5/2020 | Burkhard et al. |
| 10,669,049 B2 | 6/2020 | Eberhardt et al. |
| 11,485,530 B2 | 11/2022 | Dietersberger et al. |
| 2012/0101628 A1* | 4/2012 | Hahn ..................... B65B 5/105 414/788.1 |
| 2012/0276796 A1* | 11/2012 | Xin ..................... D06M 23/12 442/123 |
| 2016/0107781 A1* | 4/2016 | Hutter ..................... B65B 43/52 53/467 |
| 2021/0331821 A1 | 10/2021 | Nichols et al. |
| 2022/0035345 A1 | 2/2022 | Scherl et al. |

FOREIGN PATENT DOCUMENTS

| | | |
|---|---|---|
| DE | 2933086 A1 | 4/1981 |
| DE | 29807325 U1 | 9/1999 |
| DE | 202005019906 U1 | 5/2007 |
| DE | 202009001676 U1 | 8/2010 |
| DE | 102014214697 A1 | 1/2016 |
| DE | 102018000405 A1 | 7/2019 |
| DE | 102018119575 A1 | 2/2020 |
| EP | 2204342 A1 | 7/2010 |
| EP | 2447168 A1 | 5/2012 |
| EP | 2471728 A1 | 7/2012 |
| GB | 974237 A | 11/1964 |
| JP | 6898436 B2 | 6/2021 |
| WO | 2017001750 A1 | 1/2017 |

OTHER PUBLICATIONS

Machine Translation of DE 202009001676 U1 (2010).
English abstract for DE 2933086 A1 (1981).
English abstract for DE 102018000405 A1 (2019).
English abstract for EP 2471728 A1 (2012).

* cited by examiner

DEVICE FOR CONVEYING CONTAINERS AND USE THEREOF

CROSS-REFERENCE TO RELATED APPLICATIONS

This application claims priority under 35 U.S.C. § 119(a) to DE 10 2022 114 419.4, filed Jun. 8, 2022, the content of which is incorporated herein by reference in its entirety.

TECHNICAL FIELD

The invention relates to a device for conveying containers and to a container processing facility with a device for conveying containers. The invention further relates to the use of a device for conveying containers or of a container processing facility with a device for conveying containers.

TECHNICAL BACKGROUND

Facilities for filling and packing liquid products (e.g., beverages, personal care products, cleaning agents, etc.) generally feature multiple machines through which the containers pass in succession. The machines can have, for example, a stretch blow molding machine, a bottle washing machine, a filling machine, a labeling machine, a packing machine, or a palletizing machine.

Conventionally, conveyor belts are often used to transport the containers from one machine to the next machine. These conveyor belts can have multiple tasks. This includes transport from one machine to the next machine. In addition, conveyor belts can also function as buffers. These are usually wide conveyor belts (the width of the conveyor belt being significantly greater than the width of the containers) on which many containers can be accumulated together in mass transport.

With the conventional technique, containers that are not self-supporting, for example for cosmetics or healthcare, can only be transported with constraints. Thus, for example, only self-supporting containers can be transported and buffered on conveyor belts. In the case of specially shaped containers that are not self-supporting, such as those used for shower gels and the like, for example, there is a high risk of falling in mass transport. The conveyor speed must be significantly decreased, which likewise leads to a significant decrease in the throughput of the facility.

In most processing machines, the containers are processed in single file, i.e., one after the other. If mass transport is present upstream of such a machine, an individualization path is required to gather the containers from the wide mass transporter onto one track. This individualization is intensive in both space and cost.

In many cases, mass transport is provided between the wet and dry parts of the facility, i.e., usually between the labeling machine and the packing machine. This affords the advantage of being able to buffer a certain number of containers in the event of a malfunction in the packing machine. This can be important, for example, in order to be able to empty the oven of a stretch blow molding machine despite downstream machines being out of action in order to avoid destroying the preforms in the oven. The infeeds of current packing machines often require a lane-guided infeed, i.e., the containers must enter the machine next to one another in multiple rows. To transition from mass transport to a lane-guided infeed, additional devices are required, for example an accumulation section in which the containers are guided from the mass flow into individual lanes. This is a region in which many disruptions can occur due to containers getting stuck or falling.

WO 2017/001750 A1 discloses a device for packing products, the device comprising a packing module in which the products are packed in batches by shrink-wrapping or case packing, and also a belt extending in a conveying direction in order to supply said module with batches of products. The device further has a supply means which delivers the products on the belt from a station upstream of the packing device, the supply means extending at least partially through at least one lateral zone belonging to the packing device, next to the belt.

US 2021/0331821 A1 discloses a packing system comprising a first transfer station to receive a plurality of products thereon, a staging station comprising a track and a plurality of shuttle members configured to move along a path defined by the track, and a second transfer station with a robotic arm coupled to a plurality of gripping members. The multiple gripping members can be configured to pick up the multiple products from one or more of the multiple shuttle members.

The object of the invention is to provide an improved device for conveying containers with which unstable containers can preferably also be conveyed quickly and reliably, and preferably with a buffering capability.

SUMMARY OF THE INVENTION

The object is achieved by the invention.

One aspect of the present disclosure relates to a device for conveying containers for a container processing facility. The device has a first, preferably continuous, container conveyor and a second, preferably continuous, container conveyor, which has multiple preferably plate-shaped carriers for transporting the containers. The device further has a transfer station by means of which the containers can be removed from the first container conveyor and positioned on the multiple carriers of the second container conveyor.

Advantageously, the device makes it possible for containers that are unstable or unsuitable for accumulation to be transported reliably by means of the carriers of the second container conveyor. The carriers can significantly reduce the risk of falling. In addition, buffering of containers unsuitable for accumulation can easily be achieved by means of the carriers of the second container conveyor. The containers can always be guided by means of the carriers and thus be suitable for accumulation. An accumulation section can be dispensed with since, by virtue of the carriers, the containers preferably already arrive in the required formation downstream of the second container conveyor, for example at a packing machine. Separate grouping of the containers upstream of the packing machine can thus also be dispensed with. Compared with the conventional techniques, the device can also be particularly compact and, for example, have a significantly smaller facility footprint. Advantageously, the carriers can also contribute to decreasing the number of format parts required, since a carrier can replace a plurality of format parts. A further advantage can lie in container tracking, since mass transport is dispensed with. Each container can be tracked in a targeted manner.

In one embodiment, the multiple carriers each have multiple container holders for accommodating multiple of the containers (e.g., one container holder per container to be accommodated), wherein the number of the multiple container holders is preferably $\geq 2$, $\geq 3$, $\geq 4$, $\geq 5$, $\geq 6$ or $\geq 10$. Advantageously, multiple containers can thus be transported in a self-supporting manner per carrier, and preferably already in a formation as required by a packing device arranged downstream.

Preferably, the multiple container holders can be configured to be identical or at least partially different, for example in dimensions and/or shape.

In a further exemplary embodiment, the multiple container holders have one or more, preferably grouped, first container holders and one or more, preferably grouped, second container holders. The one or more first container holders on the one hand, and the one or more second container holders on the other hand, can be configured to be different from one another, preferably in dimensions and/or shape. Advantageously, different container formats can thus also be transported per carrier, whereby a container format can be changed in a simple manner without complicated modification of the second container conveyor.

Preferably, the multiple first container holders and the multiple second container holders can be arranged on the same side (e.g., the upper side) of each respective carrier, for example grouped next to one another. Alternatively, the multiple first container holders and the multiple second container holders can be arranged on different sides of the respective carrier, for example on an upper side and on an underside of the respective carrier.

In a further exemplary embodiment, the multiple container holders are configured as depressions or recesses in an upper side of the respective carrier.

Preferably, the multiple container holders can each be shaped to accommodate a footprint or base of the containers.

In a further exemplary embodiment, the second container conveyor has a continuous conveying element, preferably a conveyor belt, carrier belt, conveyor band or conveyor chain. The multiple carriers can be borne on the conveying element and preferably rest thereon loosely, have buffering capability and/or accumulation capability. Advantageously, the second container conveyor can thus be constructed in a structurally particularly simple and cost-effective manner and still allow buffering, since the carriers with the containers can be moved together in an accumulation by means of the conveying element.

In one embodiment, the multiple carriers are configured as pucks, preferably packaging pucks. Alternatively or additionally, the multiple carriers can be buffered and/or accumulated by the second container conveyor. Alternatively or additionally, the second container conveyor is configured as a buffer conveyor for selectively accumulating the multiple carriers and relieving congestion in the multiple carriers. Alternatively or additionally, the second container conveyor has a buffer section, preferably downstream of the transfer station. Alternatively or additionally, a length of the transport section of the second container conveyor is greater, preferably at least 50%, at least 70% or at least 100% greater than a length of the transport section of the first container conveyor. Advantageously, buffering of the containers on the second container conveyor is thus be made possible.

In a further embodiment, the multiple carriers can be moved independently of one another. Alternatively or additionally, the second container conveyor can be configured as a long-stator linear motor conveyor, a short-stator linear motor conveyor or a planar motor conveyor, and the multiple carriers can be configured as movement devices moved by the long-stator linear motor conveyor, the short-stator linear motor conveyor or the planar motor conveyor which are movable independently of one another. This can advantageously allow the carriers to be individually moved and controlled. A further advantage can consist in that the carriers with the containers can be placed very precisely in a packing device or can even go to different stations. A brief reverse movement can also be possible. In this regard, the planar motor conveyor offers even greater flexibility with respect to movement, positioning and modification.

In a further embodiment, the multiple carriers are exchangeable, preferably without tools. Alternatively or additionally, the multiple carriers can be removed from the second container conveyor by means of the transfer station and can preferably be transported to a parking station or to an automated guided vehicle. Alternatively or additionally, the multiple carriers can be positioned on the second container conveyor by means of the transfer station, preferably taken from a parking station or an automated guided vehicle. It is thus advantageously possible to provide a design that requires as few equipment parts as possible. For equipment parts that are difficult to avoid, such as container-specific carriers, quick-change methods can be used. Thus, in the case of a change in container format or a change in packing format, the carriers can preferably be removed from the second container conveyor fully automatically by means of the transfer station. The removed carriers can be transported away for storage, for example by means of the automated guided vehicle. Likewise, new carriers that have the desired format can preferably be delivered by means of the automated guided vehicle and be placed onto the second container conveyor by the transfer station.

In one embodiment, the transfer station is configured to grab the containers from the first container conveyor and position the grabbed containers on the carriers. Alternatively or additionally, the transfer station is configured to reorient the containers removed from the first container conveyor in a predefinable orientation and optionally to position them on the multiple carriers in the predefinable orientation. Alternatively or additionally, the transfer station can be configured to remove a multiple of the containers, preferably simultaneously, from the first container conveyor in one work cycle, and to position the removed containers, preferably simultaneously, on multiple of the carriers, preferably simultaneously. Preferably, the flexibility and throughput of the device can thus be increased.

In a further embodiment, the transfer station has at least one robot device, preferably an articulated robotic arm device, a delta robot device, or a SCARA robot device for removing the containers from the first container conveyor and for positioning the containers on the multiple carriers of the second container conveyor. Optionally, the at least one robot device can have a grabber for grabbing one or more of the containers from the first container conveyor.

In one exemplary embodiment, the at least one robot device has multiple (e.g., two or three) robot devices, which are preferably arranged next to one another, preferably parallel to a longitudinal axis of the first container conveyor and/or to a longitudinal axis of the second container conveyor.

In another exemplary embodiment, the device further has a controller configured to operate the multiple robot devices such that at least two of the multiple robot devices each position at least one container to a common carrier from among the multiple carriers. Alternatively or additionally, the controller can be configured in such a way that, in one work cycle, the multiple robot devices each remove multiple of the containers, preferably simultaneously, from the first container conveyor and position the removed containers, preferably simultaneously, on multiple of the carriers. Advantageously, the load on the robot devices can thus be as uniform as possible and the loading of the carriers can thus be as continuous as possible, for example as the carriers travel substantially constantly along the second container conveyor.

Preferably, the term "controller" can refer to an electronic system (e.g., embodied as a driver circuit or with microprocessors and memory) that can perform control tasks and/or regulating tasks and/or processing tasks depending on the configuration. Although the term "control" is used herein, this can also comprise or be understood as "regulate" or "feedback-control" and/or "process."

In one embodiment, the first container conveyor is configured as a long-stator linear motor conveyor, a short-stator linear motor conveyor, or a planar motor conveyor. Alternatively or additionally, the first container conveyor can be configured to adjust a relative distance of the container transported by the first container conveyor, preferably to have a predefinable relative distance between adjacent containers. Advantageously, the first container conveyor can space the containers relative to one another in a way that is favorable for a subsequent step. Gaps in the container stream, for example due to containers being removed upstream of the first container conveyor (e.g., in the labeling device), can be closed.

It is possible for a container transfer section of the first container conveyor from which the containers can be removed by means of the transfer station, and a container accepting section of the second container conveyor, in which the containers can be positioned on the multiple carriers by means of the transfer station, to run parallel to one another and/or have opposite conveying directions. Advantageously, particularly quick container transfer by means of the transfer station can thus be made possible.

A further aspect of the present disclosure relates to a container processing system with a device for conveying containers as disclosed herein. The container processing facility can preferably have a labeling device for labeling the containers, which is preferably arranged directly upstream of the first container conveyor. Alternatively or additionally, the container processing facility can have, for example, a packing device for packing the containers, which is preferably arranged directly downstream of the second container conveyor and preferably configured to pack the containers in groups (e.g., packs) in the format predetermined by the multiple carriers. The container processing system can advantageously afford the same advantages as those which have already been explained with reference to the device for conveying containers.

The container processing facility can preferably be configured to produce, clean, coat, check, fill, seal, label, decorate, print on and/or pack containers for liquid media, preferably beverages, liquid foodstuffs, cleaning agents, cosmetic products or care products.

For example, the containers can be configured as bottles, cans, canisters, cartons, vials, etc.

Another aspect of the present disclosure relates to the use of a device as disclosed herein or to a container processing facility as disclosed herein to convey containers, wherein the containers preferably each have a footprint which is elongate (e.g., oval), wherein, for example, a length of the footprint of the containers is at least 50%, at least 70% or at least 100% greater than a width of the footprint of the containers. The use can advantageously afford the same advantages as those which have already been explained with reference to the device for conveying containers.

The preferred embodiments and features of the invention described above can be combined with one another as desired.

BRIEF DESCRIPTION OF THE FIGURES

Further details and advantages of the invention are described below with reference to the appended drawings. In the drawings.

The embodiments shown in the figures correspond at least in part, so that similar or identical parts are provided with the same reference signs and reference is also made to the description of other embodiments or figures for the explanation thereof to avoid repetition.

DETAILED DESCRIPTION OF EXEMPLARY EMBODIMENTS

Figure 1:
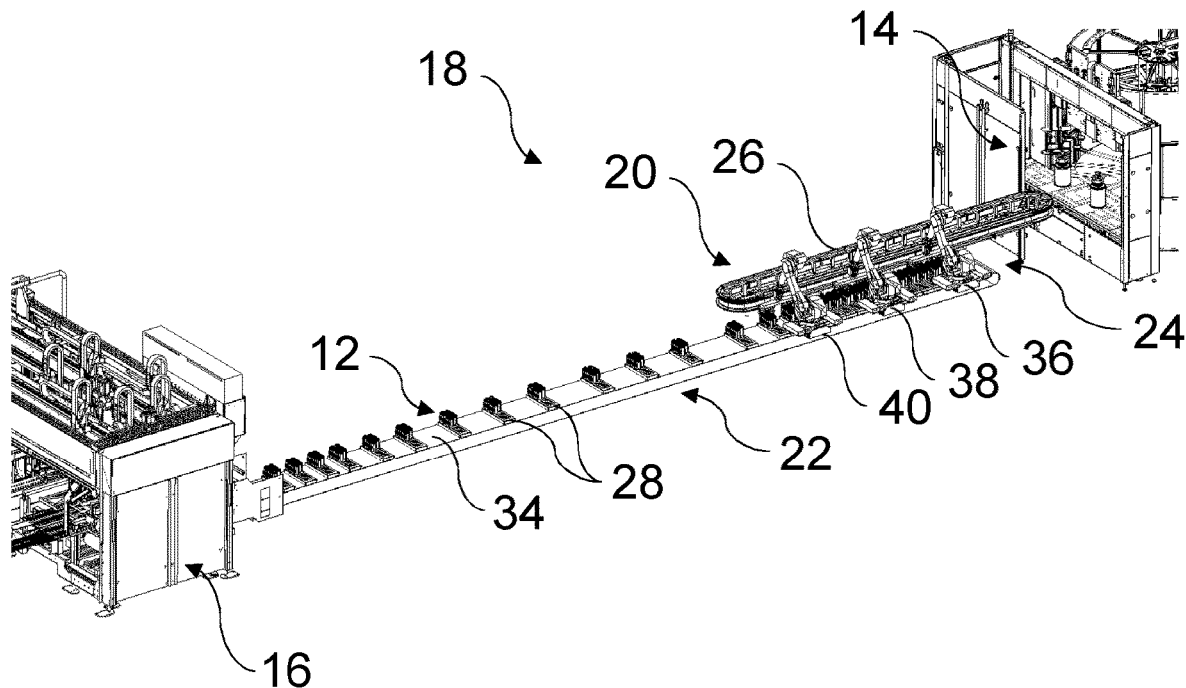
FIG. 1 shows a perspective view of a section of a container processing system according to one exemplary embodiment of the present disclosure.

FIG. 1 shows a section of a container processing facility 10. Containers 12 can be processed in the container processing facility 10. Preferably, a base or footprint of the containers 12 can be elongate, for example oval or substantially rectangular with rounded corners. For example, a length of the footprint of the containers 12 can be at least 50%, at least 70% or at least 100% greater than a width of the footprint of the containers 12. The containers 12 can therefore have an increased tendency to tip on a longitudinal axis of the base or footprint.

The container processing facility 10 has a device 18 for conveying and preferably buffering the containers 12. Optionally, the container processing facility 10 can have a labeling device 14 and/or a packing device 16.

The labeling device 14 can be arranged upstream (in the direction of movement of the containers) of the device 18. A filling device for filling the containers 12 and/or a sealing device for sealing the containers 12 can also be arranged upstream of the labeling device 14, for example.

The labeling device 14 can label the containers 12. The labels can, for example, be self-adhesive, shrink-fitted, or applied to the containers 12 by means of an adhesive (e.g., glue). The labeling device 14 can, for example, be configured as a linear labeling device or, as shown in FIG. 1, as a rotary labeling device.

The packing device 16 can be arranged downstream (in the direction of movement of the containers) of the device 18.

The packing device 16 can pack the containers 12, preferably in packs of multiple containers 12. The packing device 16 can preferably receive the containers 12 in a format or grouping from the device 18, which corresponds to a packing format or packaging format used by the packing device 16.

Figure 2:
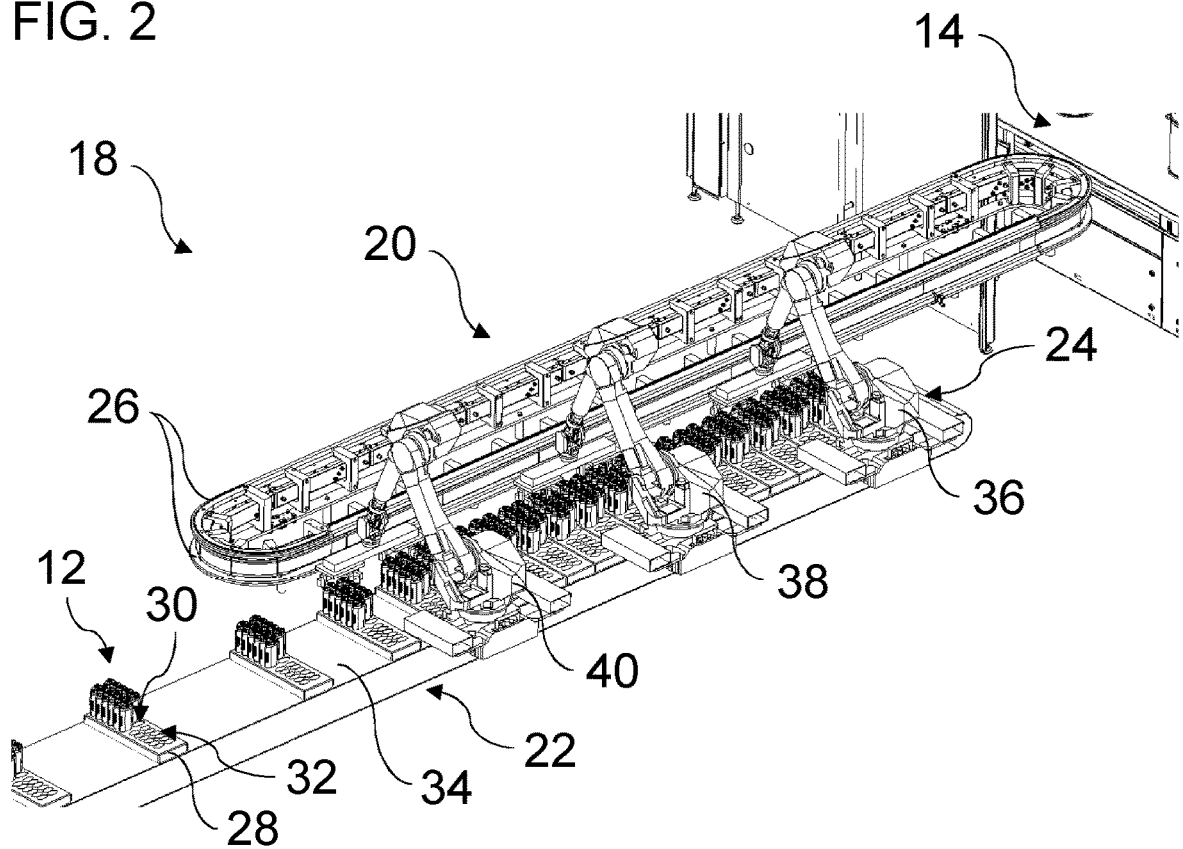
FIG. 2 shows a perspective view of a device for conveying containers according to one exemplary embodiment of the present disclosure.
Figure 3:
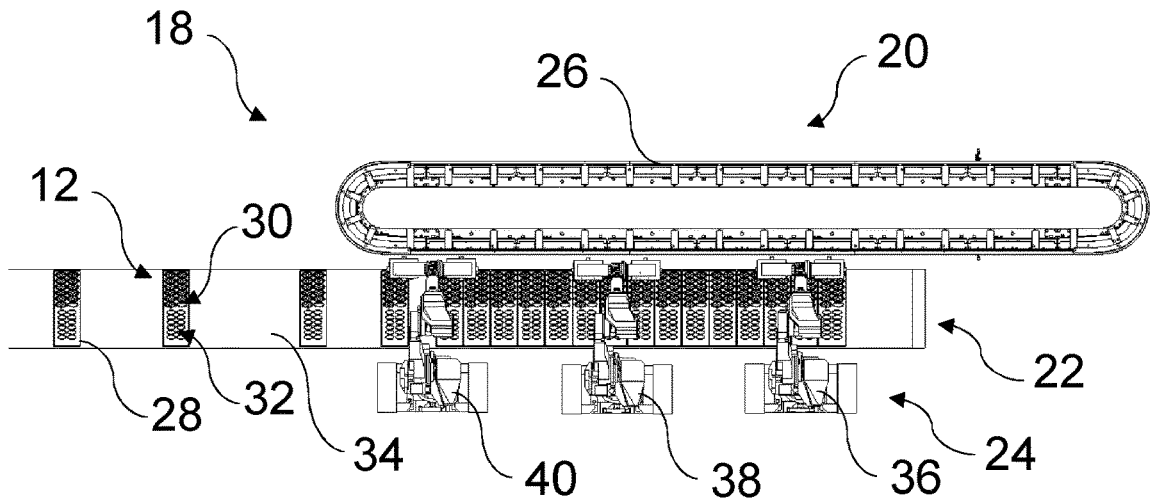
FIG. 3 shows a top view of the exemplary device for conveying containers.

The device 18 is shown in FIGS. 1 to 3.

The device 18 can connect the labeling device 14 and the packing device 16 to one another. The device 18 can receive the containers 12 from the labeling device 14. The device 18 can transport the containers 12 to the packing device 16.

The device 18 has a first container conveyor 20, a second container conveyor 22 and a transfer station 24. The device 18 can have a controller (not shown in FIGS. 1 to 3), which can be configured to operate the first container conveyor 20, the second container conveyor 22 and/or the transfer station 24 according to the functions thereof explained herein.

Preferably, the first container conveyor 20 can be a continuous container conveyor. For example, the first container conveyor 20 can have a substantially oval course, as shown in FIGS. 1 to 3. The course can be oriented, for example, in a horizontal plane (as shown) or in a vertical plane.

The first container conveyor 20 can be arranged, preferably directly, downstream of the labeling device 14. The first container conveyor 20 can receive the containers 12 from the labeling device 14. The first container conveyor 20 can receive the containers 12, for example, with a predetermined spacing of X mm (e.g., 126 mm). It is possible for there to be gaps in the container stream which are caused, for example, by defective containers being removed upstream of the first container conveyor 20.

The first container conveyor 20 can be arranged directly upstream of the transfer station 24. The first container conveyor 20 can convey the containers 12 to the transfer station 24. During transport to the transfer station 24, the containers 12 can have their orientation relative to one another adjusted (e.g., be rotated), their distances relative to one another adjusted and/or be grouped into groups of two or more containers 12 by the first container conveyor 20.

Preferably, the first container conveyor 20 can transport the containers 12 independently of one another and/or individually. Particularly preferably, the first container conveyor 20 can be configured to adjust a relative distance between the transported containers 12. Preferably, the distances between adjacent containers 12 can be adjusted by the first container conveyor 20 in such a way that adjacent containers 12 on the first container conveyor 20 have a predefinable relative distance between one another.

The first container conveyor 20 can be configured, for example, as a long-stator linear motor conveyor or a short-stator linear motor conveyor, as shown in FIGS. 1 to 3. The long-stator linear motor conveyor or short-stator linear motor conveyor can have multiple movement devices, movers or shuttles for transporting containers (not shown in detail in FIGS. 1 to 3). Each movement device can transport one or more containers 12. The movement devices can be guided along a preferably continuous guide track 26, for example by means of rollers or sliding shoes. The movement devices can be driven independently of one another along the guide track 26. The movement devices can be driven by means of magnetic interaction between permanent magnets and electromagnets (=short stator or long stator). In the case of a long-stator linear motor conveyor, the movement devices can have the permanent magnets, and the electromagnets can be arranged in multiple long stator segments along the guide track 26, for example. In the case of a short-stator linear motor conveyor, the movement devices can have the electromagnets, and the permanent magnets can be arranged along the guide track 26.

Alternatively, the first container conveyor 20 can be configured as a planar motor conveyor, for example (not shown in FIGS. 1 to 3). The planar motor conveyor can have multiple movement devices, movers or shuttles for transporting containers with at least two degrees of freedom (x-direction and y-direction). The movement devices can preferably be moved independently of one another by means of a planar drive surface through magnetic interaction with the drive surface. It is also possible for there to be a lifting movement (z-direction) and/or a tilting movement of the movement devices relative to the drive surface by means of the magnetic interaction. Preferably, the drive surface can be oriented horizontally or vertically. Each movement device can transport one or more containers.

It is possible for there to be an additional (third) container conveyor (not shown in the figures). The additional container conveyor can be arranged above, next to or below the first container conveyor. The additional container conveyor can in principle be configured as already explained for the first container conveyor 20. The additional container conveyor can be used to increase throughput, for example. Alternatively, the additional container conveyor can be configured to transport containers with another container format than those of the first container conveyor 20, for example. In this way, a change in container format can preferably be made possible without modification in this region of the device 18.

Preferably, the second container conveyor 22 can be a continuous container conveyor. For example, the second container conveyor 22 can have a substantially oval course, as shown in FIGS. 1 to 3. The course can be oriented, for example, in a horizontal plane (as shown).

The second container conveyor 22 can be arranged directly downstream of the transfer station 24. The second container conveyor 22 can receive the containers 12 from the transfer station 24.

The second container conveyor 22 can be arranged directly upstream of the packing device 16. The second container conveyor 22 can convey the containers 12 to the packing device 16. During transport to the packing device 16, the containers 12 can preferably be buffered if needed, for example by accumulating the containers 12.

The second container conveyor 22 has multiple preferably plate-shaped carriers 28 for transporting the containers 12. The carriers 28 are preferably configured as so-called pucks, preferably packaging pucks (pucks for multiple containers in each case). The pucks can each carry one or more containers 12.

The carriers 28 can each have one or more container holders 30, 32 for accommodating one or more containers 12. Preferably, the number of the multiple container holders 30, 32 can be ≥2, ≥3, ≥4, ≥5, ≥6 or ≥10. Preferably, the at least one container holder 30, 32 can be shaped to accommodate a base or footprint of the containers 12. Particularly preferably, a shape (e.g., profile and/or contour) of the at least one container holder 30, 32 can be matched to a shape of a base or footprint of the containers 12.

It is possible for the multiple container holders 30, 32 to be configured identically. The container holders 30, 32 can thus accommodate the same container formats.

Alternatively, at least one first container holder 30 and at least one second container holder 32 can be comprised in each carrier 28, for example. The at least one first container holder 30 and the at least one second container holder 32 can be configured to be different from one another, preferably in dimensions and/or shape. Preferably, the at least one first container holder 30 can accommodate a container format other than that accommodated by the at least one second container holder 32. For example, different container formats can be transported in this way, e.g., 250 ml containers and 350 ml containers.

For example, each carrier 28 can comprise multiple first container holders 30 and multiple second container holders 32. The first container holders 30 and the second container holders 32 can be arranged on the same side (e.g., upper side) of the respective carrier 28, for example grouped next to one another as shown in FIGS. 1 to 3. Alternatively, the multiple first container holders 30 and the multiple second container holders 34 can be arranged on different sides of the respective carrier 28, for example on an upper side and on an underside of the respective carrier. In this case, a change in container format requires only that the carriers 28 be turned over.

The at least one container holder 30, 32 can preferably be configured as depressions or recesses in an upper side of the respective carrier. It is understood that modified embodiments of the carriers 28 are also possible.

The carriers 28 can be moved together with the containers 12 positioned thereon by means of the second container conveyor 22 from the transfer station 24 to a downstream end region of the second container conveyor 22. The packing device 16 can preferably be arranged in the downstream end region or downstream thereof. Preferably, the packing device 16 can pack the containers 12 in groups in the format predetermined by the respective carriers 28, e.g., to form packs. It is possible for the packing device 16 to remove the containers 12 directly from the carriers 28 for packing or to pack the containers 12 directly on the carriers 28, e.g., to wrap them.

After the containers 12 have been removed (e.g., to the packing device 16), the carriers 28 can be transported back to the transfer station 24. For example, a separate return conveyor can transport the carriers 28 back to the transfer station 24. For the sake of clarity, the return conveyor is not shown in FIGS. 1 to 3. Alternatively, it is possible, for example, for the second container conveyor 22 itself to transport the carriers 28 at least partially back to the transfer station 24.

Preferably, the carriers 28 are provided in or on the second container conveyor 22 in an exchangeable manner. Preferably, the carriers 28 can be exchanged without tools, e.g., by removing one carrier 28 and replacing the removed carrier 28 with another carrier 28. For example, the carriers 28 can be removed by means of the transfer station 24 and/or can be positioned on the second container conveyor 22 by means of the transfer station 24. The transfer station 24 can transport the removed carrier 28 directly or indirectly to a parking station or to an automated guided vehicle (AGV), for example. Alternatively or additionally, the transfer station 24 can take a (or another) carrier 28 from a parking station or an automated guided vehicle and position it on the second container conveyor 22.

The carriers 28 can be buffered and/or accumulated by the second container conveyor 22. Specifically, the second container conveyor 22 can be configured as a buffer conveyor for selectively accumulating the carriers 28 and relieving congestion in multiple carriers 28.

The second container conveyor 22 is preferably long enough to have sufficient space for buffering a number of containers 12 or carriers 28 if needed. Accordingly, the second container conveyor 22 can have a buffer section. For example, a length of the transport section of the second container conveyor 22 can be greater, preferably at least 50%, at least 70% or at least 100% greater, than a length of the transport section of the first container conveyor 20.

To accumulate the carriers 28, these can preferably be movable independently of one another. For this, different configurations of the second container conveyor 22 can be provided.

For example, the second container conveyor 22 can have a continuous conveying element 34. The conveying element 34 can preferably have a conveyor belt, a carrier belt, a conveyor band or a conveyor chain, e.g., a flat top chain conveyor. The multiple carriers 28 can be borne by the conveying element 34. Preferably, the carriers 28 can rest loosely on the conveying element 34, so that they can preferably be buffered by accumulating the carriers 28.

Alternatively, the second container conveyor 22 can be configured as a long-stator linear motor conveyor, a short-stator linear motor conveyor or a planar motor conveyor (not shown in FIGS. 1 to 3), for example.

The long-stator linear motor conveyor or short-stator linear motor conveyor can have multiple movement devices, movers or shuttles for transporting containers. The movement devices can form or have the carriers 28. The movement devices can be guided along a preferably continuous guide track, for example by means of rollers or sliding shoes. The movement devices can be driven independently of one another along the guide track. The movement devices can be driven by means of magnetic interaction between permanent magnets and electromagnets (=short stator or long stator). In the case of a long-stator linear motor conveyor, the movement devices can have the permanent magnets, and the electromagnets can be arranged in multiple long stator segments along the guide track, for example. In the case of a short-stator linear motor conveyor, the movement devices can have the electromagnets, and the permanent magnets can be arranged along the guide track.

The planar motor conveyor can have multiple movement devices, movers or shuttles for transporting containers with at least two degrees of freedom (x-direction and y-direction). The movement devices can form or have the carriers 28. The movement devices can preferably be moved independently of one another by means of a planar drive surface through magnetic interaction with the drive surface. It is also possible for there to be a lifting movement (z-direction) and/or a tilting movement of the movement devices relative to the drive surface by means of the magnetic interaction. Preferably, the drive surface can be oriented horizontally or vertically.

The transfer station 24 can remove the containers 12 from the first container conveyor 20. The containers 12 can, for example, each be grabbed from the transfer station 24 individually or in a group. The transfer station 24 positions the removed containers 12 on the carriers 28 of the second container conveyor 22. For example, the grabbed containers 12 can be positioned on the carriers 28 by the transfer station 24 and released there. Preferably, the carriers 28 can move in a conveying direction of the second container conveyor 22 as the transfer station 24 positions the containers 12 on the carriers 28.

The transfer station 24 can thus be considered as a transfer station for transferring the containers 12 from the first container conveyor 20 to the second container conveyor 22.

The transfer station 24 can be arranged directly downstream of the first container conveyor 20 and directly upstream of the second container conveyor 22 relative to the container stream.

The transfer station 24 can, if needed, be configured to reorient the containers 12 removed from the first container conveyor 20 in a predefinable orientation.

A position of the container 12 to be removed from the first container conveyor 20 can, for example, be extracted or inferred from control data, for example when the first container conveyor 20 is configured as a long-stator linear motor conveyor, a short-stator linear motor conveyor or a planar motor conveyor. Alternatively or additionally, the device 18 can have a sensor system for detecting the position of the containers 12 on the first container conveyor 20. For example, the sensor system can be optical, preferably camera-based.

A position of the carrier 28 on the second container conveyor 22 for positioning the removed container 12 can, for example, be extracted or inferred from control data, for example when the second container conveyor 22 is configured as a long-stator linear motor conveyor, a short-stator linear motor conveyor or a planar motor conveyor. Alternatively or additionally, the device 18 can have a sensor system for detecting the position of the carriers 28 on the second container conveyor 22. For example, the sensor system can be optical, preferably camera-based.

The transfer station 24 preferably has at least one robot device 36, 38, 40. The at least one robot device 36, 38, 40 can remove the containers 12 from the first container conveyor 20 and position them on the carriers 28 of the second container conveyor 22. The at least one robot device 36, 38, 40 preferably has at least one grabber for removing the containers 12 from the first container conveyor 20 and for releasing the grabbed containers 12 on the carriers 28.

The at least one robot device 36, 38, 40 can be configured, for example, as an articulated robotic arm device, as shown in FIGS. 1 to 3. Alternatively, the at least one robot device 36, 38, 40 can be configured, for example, as a delta robot device or a SCARA robot device.

Multiple robot devices 36, 38, 40 is particularly preferred. The robot devices 36, 38, 40 can preferably be arranged next to one another, for example parallel to a longitudinal axis of the first container conveyor 20 and/or to a longitudinal axis of the second container conveyor 22.

A variety of possibilities are conceivable for positioning the containers 12 on the carriers 28 removed from the first container conveyor 20.

It is preferred here for at least one container 12 to be positioned on the carriers 28 by each of the multiple robot devices 36, 38, 40. The robot devices 36, 38, 40 can each position at least one container 12 on one of the multiple carriers 28. For example, the first robot device 36 can position at least one container 12 on a carrier 28. The second robot device 38 can position at least one container 12 on the same carrier 28. Optionally, the third robot device 40 can position at least one container 12 on the same carrier 28.

It is also preferred here if the transfer station 24 or each of the robot devices 36, 38, 40 removes multiple containers 12, preferably simultaneously, from the first container conveyor 20 and positions the removed containers 12, preferably simultaneously, on multiple of the carriers 28. For example, the first robot device 36 can position multiple removed containers 12 on two, three or more carriers 28.

Figure 4:
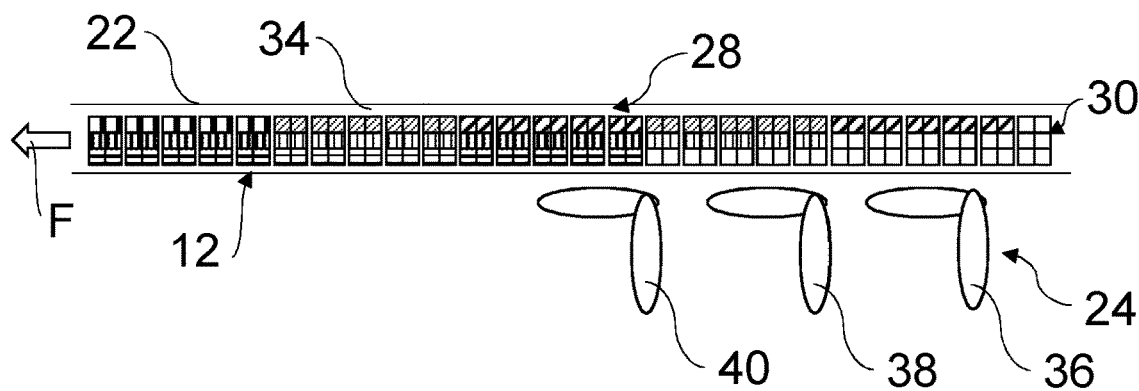
FIG. 4 shows a schematic representation to explain one example of the operation of a transfer station of the exemplary device for conveying containers.
Figure 5:
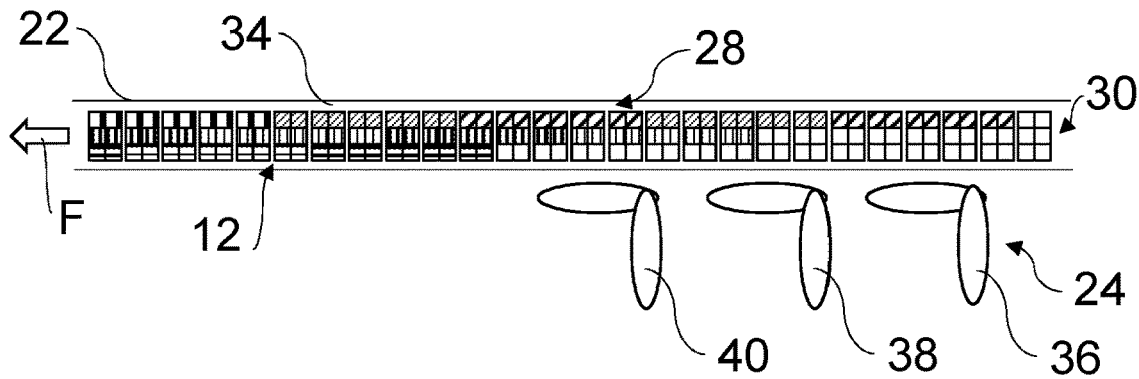
FIG. 5 shows a schematic representation to explain another example of the operation of a transfer station of the exemplary device for conveying containers.

FIGS. 4 and 5 show, purely schematically, two exemplary modes of operation of the transfer station 24. In both figures, the carriers 28 each have an accommodation capacity of six containers 12 in 3×2 format. The containers 12 positioned by the first robot device 36 are marked with diagonal hatching. The containers 12 positioned by the second robot device 38 are marked with vertical hatching. The containers 12 positioned by the third robot device 40 are marked with horizontal hatching. Containers positioned in successive work cycles are marked with different distances between the respective hatched lines (first work cycle: large distance between hatched lines=>second work cycle: small distance between hatched lines=>third work cycle: large distance between hatched lines=>etc.). The conveying direction of the second container conveyor 22 is indicated by an arrow F.

In the exemplary mode of operation in FIG. 4, the first robot device 36 can position ten containers 12 on five carriers 28 per work cycle, namely two containers 12 per carrier 28. The second robot device 38 can position ten further containers 12 on the same carriers 28 per work cycle, namely two containers 12 per carrier 28. The third robot device 40 can position ten additional further containers 12 on the same carriers 28 per work cycle, namely two containers 12 per carrier 28.

In the exemplary mode of operation of FIG. 5, the mode of operation of FIG. 4 is modified such that the carriers 28 on which the robot devices 36, 38, 40 position ten containers 12 per work cycle are at least partially different.

The invention is not limited to the preferred exemplary embodiments described above. Rather, a plurality of variants and modifications are possible which likewise make use of the inventive concept and therefore fall within the scope of protection. In particular, the invention also claims protection for the subject matter and the features of the dependent claims independently of the claims to which they refer. In particular, the individual features of independent claim 1 are each disclosed independently of one another. In addition, the features of the dependent claims are also disclosed independently of all of the features of independent claim 1 and, for example, independently of the features relating to the presence and/or the configuration of the first container conveyor, of the second container conveyor and/or of the transfer station of independent claim 1. All ranges specified herein are to be understood as disclosed in such a way that all values falling within the respective range are individually disclosed, e.g., also as the respective preferred narrower outer limits of the respective range.

LIST OF REFERENCE SIGNS

10 Container processing facility
12 Container
14 Labeling device
16 Packing device
18 Device for conveying containers
20 First container conveyor
22 Second container conveyor
24 Transfer station
26 Guide track
28 Carrier
30 First container holder
32 Second container holder
34 Conveying element
36 First robot device
38 Second robot device
40 Third robot device
F Conveying direction

What is claimed is:

1. A device for conveying containers for a container processing facility, comprising:
   a first container conveyor;
   a second container conveyor which has multiple carriers for transporting the containers; and
   a transfer station configured to remove the containers from the first container conveyor and to position the containers on the multiple carriers of the second container conveyor,
   wherein the device comprises at least one of the following features:
   the multiple carriers are configured as pucks;
   the second container conveyor is configured to buffer the multiple carriers;

the second container conveyor is configured to accumulate the multiple carriers;
the second container conveyor is configured as a buffer conveyor for selectively accumulating the multiple carriers and relieving congestion in the multiple carriers;
the second container conveyor has a buffer section; and
a length of a transport section of the second container conveyor is greater than a length of a transport section of the first container conveyor.

2. The device according to claim 1, wherein:
the multiple carriers each have multiple container holders for accommodating multiple of the containers.

3. The device according to claim 2, wherein:
the multiple container holders have one or more first container holders and one or more second container holders; and
the one or more first container holders are configured to be different from the one or more second container holders.

4. The device according to claim 2, wherein:
the multiple container holders are configured as depressions or recesses in an upper side of the respective carrier.

5. The device according to claim 1, wherein:
the second container conveyor has a continuous conveying element; and
the multiple carriers are borne on the conveying element.

6. The device according to claim 3, further comprising at least one of the following features:
the device comprises from 2 to 10 of the multiple container holders;
the one or more first container holders are grouped;
the one or more second container holders are grouped; and
the one or more first container holders have different dimensions than the one or more second container holders; and
the one or more first container holders have different shapes than the one or more second container holders.

7. The device according to claim 1, wherein at least one of:
the multiple carriers are movable independently of one another; and
the second container conveyor is configured as a long-stator linear motor conveyor, a short-stator linear motor conveyor or a planar motor conveyor, and the multiple carriers are configured as movement devices moved by the long-stator linear motor conveyor, the short-stator linear motor conveyor or the planar motor conveyor which are movable independently of one another.

8. The device according to claim 1, wherein at least one of:
the multiple carriers are exchangeable without tools;
the multiple carriers can be removed from the second container conveyor by use of the transfer station; and
the multiple carriers can be positioned on the second container conveyor by use of the transfer station.

9. The device according to claim 1, wherein at least one of:
the first container conveyor is configured as a long-stator linear motor conveyor, a short-stator linear motor conveyor or a planar motor conveyor; and
the first container conveyor is configured to adjust a relative distance of the container transported by the first container conveyor.

10. The device according to claim 1, wherein:
the transfer station has at least one robot device, preferably an articulated robotic arm device, a delta robot device, or a SCARA robot device for removing the containers from the first container conveyor and for positioning the containers on the multiple carriers of the second container conveyor; and optionally
the at least one robot device has a grabber for grabbing one or more of the containers from the first container conveyor.

11. The device according to claim 10, wherein:
the at least one robot device has multiple robot devices arranged next to one another.

12. The device according to claim 11, further comprising:
a controller configured to operate the multiple robot devices such that at least one of:
at least two of the multiple robot devices each position at least one container on a common carrier from among the multiple carriers; and
in one work cycle, the multiple robot devices each remove multiple of the containers from the first container conveyor and position the removed containers on multiple of the carriers.

13. The device according to claim 10, further comprising at least one of the following features:
the at least one robot device is a member selected from the group consisting of an articulated robotic arm device, a delta robot device, and a SCARA robot device;
the at least one robot device has multiple robot devices arranged next to one another parallel to a longitudinal axis of the first container conveyor and/or to a longitudinal axis of the second container conveyor; and
the multiple robot devices each remove multiple of the containers simultaneously from the first container conveyor and position the removed containers simultaneously on multiple of the carriers.

14. A container processing facility comprising a device for conveying containers according to claim 1, further comprising at least one of:
a labeling device for labeling the containers, which is arranged upstream of the first container conveyor; and
a packing device for packing the containers, which is arranged downstream of the second container conveyor.

15. The container processing facility according to claim 14, wherein at least one of:
the labeling device is arranged directly upstream of the first container conveyor; and
the packing device is arranged directly downstream of the second container conveyor and configured to pack the containers in groups in a format predetermined by the multiple carriers.

16. A method of conveying containers, said method comprising:
providing the device according to claim 1;
providing containers each having a footprint which is elongate; and
conveying the containers between at least two different locations by use of the device.

17. The method according to claim 16, wherein the footprint of each of the containers has a length at least 50% greater than a width of the footprint of each of the containers.

18. A device for conveying containers for a container processing facility comprising:
a first container conveyor;
a second container conveyor which has multiple carriers for transporting the containers; and a transfer station configured to remove the containers from the first container conveyor and to position the containers on the multiple carriers of the second container conveyor, wherein at least one of:

the transfer station is configured to grab the containers from the first container conveyor and position grabbed containers on the carriers;

the transfer station is configured to reorient the containers removed from the first container conveyor in a predefinable orientation; and the transfer station is configured to remove multiple of the containers from the first container conveyor in one work cycle, and to position the removed containers on multiple of the carriers.

19. A device for conveying containers for a container processing facility, comprising:

a first container conveyor;

a second container conveyor which has multiple carriers for transporting the containers; and a transfer station configured to remove the containers from the first container conveyor and to position the containers on the multiple carriers of the second container conveyor, further comprising at least one of the following features:

the first container conveyor is continuous;

the second container conveyor is continuous;

the multiple carriers are plate-shaped;

the multiple carriers are configured as packaging pucks;

a length of a transport section of the second container conveyor is at least 50% greater than a length of a transport section of the first container conveyor;

the multiple carriers are exchangeable without tools;

the multiple carriers are configured to be transported to a parking station or to an automated guided vehicle;

the multiple carriers can be taken from a parking station or an automated guided vehicle and positioned on the second container conveyor by use of the transfer station;

the transfer station is configured to simultaneously remove multiple of the containers from the first container conveyor in one work cycle, and to simultaneously position the removed containers on multiple of the carriers;

the second container conveyor has a continuous conveying element, which is a conveyor belt, carrier belt, conveyor band or conveyor chain, wherein the multiple carriers are borne on the continuous conveying element and have buffering capability and/or accumulation capability; and the first container conveyor is configured to adjust a relative distance of the container transported by the first container conveyor to have a predefinable relative distance between adjacent containers.

* * * * *